(12) United States Patent
Grieskamp et al.

(10) Patent No.: US 7,730,462 B2
(45) Date of Patent: Jun. 1, 2010

(54) GENERALIZED COMPREHENSION IN IMPERATIVE LANGUAGES

(75) Inventors: Wolfgang Grieskamp, Redmond, WA (US); Wolfram Schulte, Bellevue, WA (US); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1686 days.

(21) Appl. No.: 10/765,486

(22) Filed: Jan. 27, 2004

(65) Prior Publication Data

US 2005/0166181 A1 Jul. 28, 2005

(51) Int. Cl.
*G06F 9/45* (2006.01)
(52) U.S. Cl. ...................................... 717/136
(58) Field of Classification Search .................. 717/136
See application file for complete search history.

(56) References Cited

U.S. PATENT DOCUMENTS

| | | | |
|---|---|---|---|
| 5,732,262 A | 3/1998 | Gillespie et al. | |
| 6,209,040 B1 | 3/2001 | Acton et al. | |

OTHER PUBLICATIONS

P.L. Wadler. Comprehending monads. In Proc. of the 1990 ACM Conference on Lisp and Functional Programming, pp. 61-78, 1990.
P. W. Trinder and P. L. Wadler. List Comprehensions and the Relational Calculus. In Proc. of 1988 Glasgow Workshop on Functional Programming, pp. 115-123.
M.P. Jones. A system of constructor classes: overloading and implicit higher-order polymorphism. In FCPA '93: Conference on Functional Programming and Computer Architecture, pp. 52-61.
P.W. Trinder, Comprehension: A query notation for DBPLs. In Proc. of the 3rd International Workshop on Database Programming Languages, Aug. 1991, pp. 49-62.
M. Fernandez, J. Simeon, and P. Wadler. A semimonad for semi-structured data. In Proc. of the 8th International Conference on Database Theory, Jan. 2001, pp. 263-300.

*Primary Examiner*—John Chavis
(74) *Attorney, Agent, or Firm*—Lee & Hayes, PLLC (57) ABSTRACT

The present invention relates to a system and methodology to enable programming of generalized comprehensions in an imperative language environment. In one aspect, a system is provided to facilitate employment of user-definable and generalized comprehensions in accordance with imperative languages. The system includes a language component to enable programming of comprehension notations in an imperative language and an interface component to describe a meaning of the comprehension notations. A translation component facilitates execution of the comprehension notations in accordance with the imperative language.

22 Claims, 9 Drawing Sheets

GENERALIZED COMPREHENSION IN IMPERATIVE LANGUAGES

TECHNICAL FIELD

The present invention relates generally to computer systems, and more particularly to a system and method that employs user-definable and generalized comprehensions in the context of imperative languages.

BACKGROUND OF THE INVENTION

Imperative languages are generally based on fully specified and fully controlled manipulation of named data in a stepwise fashion. These languages include a data declaration that binds a name to a type and possibly to a value, wherein typical basic types are integers, characters and real numbers. New types can be made using type constructors, for example, enumerations, arrays and records. Types are name-equivalent if they have the same names, and structure-equivalent if they have the same values and allow the same operations. Coersions and casts allow minor evasions of the type system.

Two features in a language are orthogonal if they can be combined freely without restricting each other in any way, whereas internal states can be modified through assignment statements, external state through output statements and values derived from expressions. The main flow-control mechanisms are sequencing, selection, repetition, and routine invocation whereby run-time errors can be caught by using signals and exceptions, for example. In program construction, four levels of hierarchy can be distinguished: blocks, routines, modules/packages and programs. Scope rules determine which declaration or declarations define a given name, and if more than one declaration is identified, contextual scope rules are employed to disambiguate. Procedures do not yield a value, functions do, and operators are different notation for functions. The main parameter passing mechanisms are call by value and call by reference.

A module defines an interface, represented by its specification part, whereas an implementation part is separate and hidden from the interface user. In principle, a separate representation part is needed, but this is generally included in the specification part. An abstract data type (ADT) is a named data type defined solely through routines for creating, manipulating and deleting values of that data type; all internal structure is hidden from the user. It differs from a module in that a module contains a type definition from which items can be declared, whereas an ADT is a type that is used directly to declare items. A generic X-unit is a template to derive X-units from, whereas a derivation process is called instantiation. Generic units can also be parameterized. Final program composition is generally performed using a system linker.

In mathematics a ZF set comprehension that describes a set of squares of the odd numbers drawn from some source set A is typically written as:

$$\{a^2 | a \in A \char`\^ odd(a)\}.$$

This mathematical notation has a very strong operation reading: for each element a in the set A, if a is odd, then add a squared to the result.

Because of the conciseness and expressive power of this notation, combined with the fact that comprehensions have a natural operation interpretation, several programming languages (starting with the functional languages KRC, Miranda, Haskell, and most recently Python) have adopted variants of the ZF notation as a programming notation to generate lists (or sets) of values. Mathematicians and computer scientist also discovered that the same comprehension notation can also be used to describe queries on both relational data-bases as well as on semi-structured, XML data. In fact, it is possible to interpret comprehensions for a wide range of mathematical structures, called monoids, or more generally monads. This implies that when users define the appropriate monadic structure, they can overload the same comprehension notation to create values in that domain. Examples of monads include state, exceptions, parsers, nondeterminism, input-output, and so forth. Unfortunately, these type of comprehensions are not generalized in form and are generally described as fixed structures. Thus, the full power of these type notations are not currently being exploited.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate programming of generalized comprehensions in an imperative language environment. Data-integration in programming languages encompasses several popular data paradigms including relational tables and semi-structured XML trees. Generalized comprehensions form a natural bridge between these two worlds in addition to expanding functionality from fixed programming structures to more flexible and powerful generalized programming models that support substantially any desired functional outcome. The present invention enables designers to program user-definable comprehension notations in an imperative, object-oriented language that allows programmers to overload the same "query" mechanism to a wide variety of programming structures that are implemented via a straight-forward interface. Translation of the comprehension notation may be modified to special cases for particular source and result monoids (mathematical structures).

In one aspect, a user-definable type or class is specified as part of a generalized comprehension. The class is associated with an interface component that provides methods that perform the function(s) of the class. The class and associated interface are applied in an exterior manner to a list or fixed comprehension function, whereby a results type is defined to receive output from the class. A translation component compiles the generalized and associated list comprehensions along with the interface methods to produce an executable format. Thus, the present invention introduces comprehension notation to an imperative, object-oriented language environment, provides the ability for users to overload the comprehension notation by implementing specified interfaces or patterns, provides the ability to apply special cases to the translation of the comprehension notation for particular source and result types, and allows alternative syntaxes among other aspects.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate integration of generalized comprehensions in an imperative programming environment. One aspect of this invention is to allow generalized comprehensions to be expressed in an imperative object-oriented language such as C#, Visual Basic, or Java, for example. To provide one understanding of comprehensions, the mathematical structure of monoids is considered. A (primitive) monoid M is a structure $(A, \oplus, 0)$ that has an associative binary operator $\oplus \in A \times A \to A$, and a neutral element 0 such that for all $a \in A$, $0 \oplus a = a$ and $a \oplus 0 = a$. A pre-monoid is a monoid without a neutral element. A parametrized (or collection) monoid $M_B$ is a monoid that has an additional injection operation unit $\in B \to A$. It is noted that any primitive monoid is also a parametrized monoid by taking unit to be the identity. For example, the monoid Sum of addition over integers is given by the triple (int, +, 0), and the parametrized monoid Set<T> of sets of elements of type T is defined by the quadruple $(\{T\}, \cup, \emptyset, \text{unit}(t)=\{t\})$.

In addition to the rules given above, particular monoids can impose additional restrictions, for instance, the operator $\oplus$ might be commutative as well. A monoid morphism $F(g) \in M \to N$ is a mapping between a monoid $M=(A, \oplus, 0)$ and a monoid $N=(B, \otimes, 1)$ such that $F(g)(a \oplus a')=F(g)(a) \otimes F(g)(a')$, $F(0)=1$ and $F(g)(\text{unit}(a))=g(a)$. The source monoid M must have less additional restrictions than the target monoid N (i.e., it is not allowed that $\oplus$ is commutative, but $\otimes$ is not).

Given an outermost monoid M, the meaning of a comprehension $\{e|e_1, \ldots, e_n\}$ can be defined inductively on the structure of the comprehension using monoid morphisms:

$$M\{e\}=\text{unit}(e)$$

$$M\{e|b \in B, e_2, \ldots, e_n\}=F(b \to M\{e|e_2, \ldots, e_n\})B$$

where $B= \ldots \otimes b \otimes \ldots$ for some collection monoid $(B, \otimes, 1)$ $$M\{e|p, e_2, \ldots, e_n\}=\text{if } p \text{ then } M\{e|e_2, \ldots, e_n\} \text{ else } 0$$

Using this translation, the comprehension $\text{Sum}\{x|x \in \{1,2,3\}\}=\text{Sum}\{x|x \in \{1\} \cup \{2\} \cup \{3\}\}=1+2+3$, computes the sum of the set of numbers $\{1,2,3\}$.

The above definition of monoid and the translation of comprehensions reflect the mathematical background of the construct, and it forms the basis of the translation of comprehensions in existing languages. However, it is not necessarily the most natural way to realize comprehensions in an imperative object-oriented language such as C#, Visual Basic of Java. In these languages, the operations of types that correspond to monoids are usually defined imperatively. For example a collection of values of type T is not defined using a binary operator $\oplus$ that combines two collections and returns a new collection, and a unit operator that creates a singleton collection, but instead it has a side-effecting Add(T t) method that adds another value to the collection, and a constructor that creates a new empty collection. Dually, a collection allows for iteration over the elements contained in the collection by providing two operations MoveNext( ) and Current. Some (infinite) collections are built lazily, i.e., they have an implicit Add method in the form of a yield return statement which is an iterator block notation as defined by the C# programming language. Also, for some monoids, the translation is completely specialized, for instance when using a comprehension to query an underlying database.

The present invention provides (a) the introduction of comprehension notation in an imperative, object-oriented language, (b) the ability for users to overload the comprehension notation by implementing certain interfaces or patterns, (c) the ability to special case the translation of the comprehension notation for particular source and result types (d) for alternative syntaxes that have similar functional patterns, including select, the ability to omit type declarations, and so forth. An example translation of a general Sum comprehension can appear as follows:

```
IEnumerable<int> xs= ...;
int s = Sum{ x*x : int x in xs, x%2 == 0 }
→
IBuilder res = Sum.GetBuilder( );
foreach(int x in xs){
  if(x%2==0){
    res.Add(x*x);
  }
}
res.GetResult( );
``` whereas an example translation of a special IEnumerable comprehension appears as:

```
IEnumerable<int> xs= ...;
IEnumerable<int> s =
  IEnumerable{ x*x : int x in xs, x%2 == 0 };
→
{ foreach(int x in xs) { if(x%2==0){ yield return x*x; }} }
```

There are many more possible syntaxes for comprehensions, for example, the last example can be written using an SQL-style select syntax as:

select x*x from x in xs where x % 2==0.

The present invention is applicable to any concrete surface syntax that can be translated into comprehensions, and in contrast to Haskell solutions, does not require higher-order kinds. In one aspect, a system is provided to facilitate generalized comprehension in an imperative language. The system includes a language component to enable programming of comprehension notations in an imperative language and an interface component to describe a meaning of the comprehension notations. A translation component facilitates execution of the comprehension notations in accordance with the imperative language.

As used in this application, the terms "component," "interface," "language," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
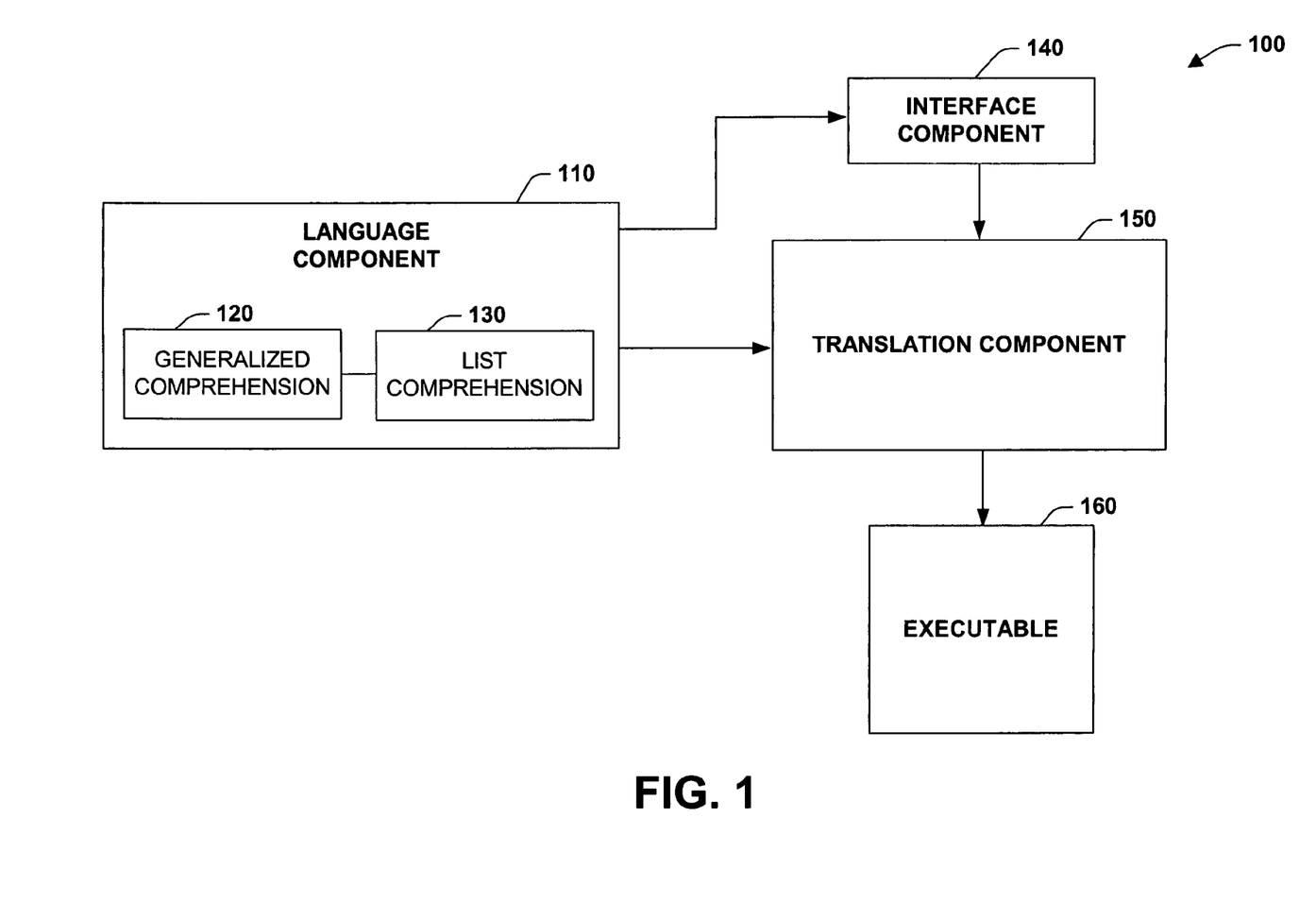
FIG. 1 is a schematic block diagram of an imperative language programming system in accordance with an aspect of the present invention.

Referring initially to FIG. 1, an imperative language programming system 100 is illustrated in accordance with an aspect of the present invention. The system 100 includes a language component 110 that allows programmers to input source code for a plurality of objects and classes. The language component 110 includes a generalized comprehension 120 that exists as an exterior function or class to a fixed or list comprehension function 130. An interface component 140 defines respective methods for the generalized comprehension 120, whereby notations associated with the generalized comprehension 120 and list comprehension 130 are compiled along with the interface component 140 by a translation component 150. Such compilation can include just-in-time compilation techniques, interpretive techniques, or more traditional forms such as source code compilation that is ultimately converted into an executable 160.

Various syntaxes can be provided to implement generalized comprehensions in accordance with the present invention. In addition, users can define substantially any type of mathematical expression, database expression, processing expression, and so forth that is associated with one or more methods supplied by the interface component 140 and also defined by the user. This can include employment of filters to remove desired items from the list comprehension 130 or include other type expressions such as qualifiers, generators, and so forth. For example, one type of comprehension can be defined by the following syntax:

comprehension::=type{expression:qualifiers}
qualifiers::=qualifier (, qualifier)*
qualifier::=generator|filter|local declaration
generator::=type$_{opt}$ identifier in expression
filter::=expression The above generic translation assumes that the comprehension type implements an IBuildable interface or has a static or instance method IBuilder<S,T> GetBuilder( ). It is to be appreciated that other interface names and instances can be employed. The interfaces IBuildable and IBuilder can be defined as follows:

```
interface IBuildable<T,s>{
    IBuilder<T,s> GetBuilder( )
}
interface IBuilder<T,S> {
    void Add(T t)
    S GetResult( )
}
```

Note: Add is merely an example of one of a plurality of user-defined or standard expressions that may be employed which are described in more detail below. For example, comprehension types can be employed for direct aggregation of collections such as:

int[ ]xs=new int[ ] {1,2,3,5};
int x=Sum(xs);

The translation of an assignment expression [[x=T{e:qs}]] can then be given by the statement sequence:

```
[[ x = T{ e : qs } ]]
→
IBuilder res = T.GetBuilder( );
[[ { e : qs } ]] res
x = res.GetResult( );
``` or when T implements IBuildable

```
[[ x = T{ e : qs } ]]
→
IBuilder res = ((IBuildable)new T( )).GetBuilder( );
[[ { e : qs } ]] res
x = res.GetResult( );
``` where the translation of the comprehension body is defined as:

```
[[ { e : } ]] res → res.Add(e);
[[ { e : B b in bs, qs } ]] res →
    foreach(B b in bs){ [[ { e : qs } ]] res }
[[ { e : p, qs } ]] res →if(p){ [[ { e : qs } ]] res }
[[ { e : T x = f; qs } res ]] → T x = f; [[ { e : qs } ]] res
```

It is noted that a comprehension type can implicitly implement the IBuilder interface. Thus, a comprehension class may have two (or more) methods of IBuilder, yet not explicitly implement the interface, but only the IBuilder pattern e.g., rather than IBuilder res=T.GetBuilder ( ); utilize implicit expression—res=newT( ). Also, it is noted that the IBuilder interface defines a method to accumulate intermediate results while evaluating the comprehension (e.g., Add) and a method to obtain the final result when the evaluation of the comprehension has terminated (e.g., result method). In general, the IBuildable interface contains a factory method to create a value that implements the IBuilder interface. Also, the interface allows the comprehension to terminate early, if necessary, without having evaluated all of its qualifiers, and provides a mechanism to define a default result for a comprehension.

When T equals IEnumerable or IEnumerator, the translation creates an anonymous yield return block, or some translation that is equivalent to this when the target language does not support these:

```
[[ x = T{ e : qs } ]]
→
x = { [[ { e : qs } ]] }
``` where the translation of the comprehension is nearly the same as before, except that it yields the result of the comprehension:

```
[[ { e : } ]] → yield return e;
[[ { e : B b in bs, qs } ]] → foreach(B b in bs){ [[ { e : qs } ]] }
[[ { e : p, qs } ]] res → if(p){ [[ { e : qs } ]] }
[[ { e : T x = f; qs } ]] → T x = f; [[ {e : qs } ]]
```

When T equals Sql, the translation creates a SQL select statement that is executed remotely. This translation leverages the algebraic laws that hold for comprehensions and that allow any comprehension to be transformed into the form T {e: ..., $a_i$ in $A_i$, ..., P} where $A_i$ does not contain nested comprehensions. While it is possible to allow mixed source comprehensions, for simplicity it is assumed that most values are drawn from a single database connection, that is each $A_i$ is a table reference. It is to be appreciated that multiple database connections can be employed. For simplicity, it can also be assumed that P is a simple predicate, it is also possible to allow complex predicates by defining a more recursive translation.

```
[[ x = T{ e : qs } ]]
→
... set up connection c and DataReader r ...
[[ { e : qs } ]] c, r
x = { while(r.Read( )){ yield return e(r); }; ... close connection ... }
``` where the translation of the comprehension constructs an appropriate SQL command:

[[{e: e: ..., $a_i$ in $A_i$, ..., P}]]c, r

→ r=c.Query("select ..., $a_i$.*, ... from ..., $A_i$ as $a_i$, ... where P"). It is noted that the above expressions are merely examples of generalized comprehensions 120 that can be employed in accordance with the present invention. In general, any comprehensive notation that appears as an exterior class to a list comprehension 130, (the exterior class having an associated interface) is considered to be within the scope of the present invention.

Figure 2:
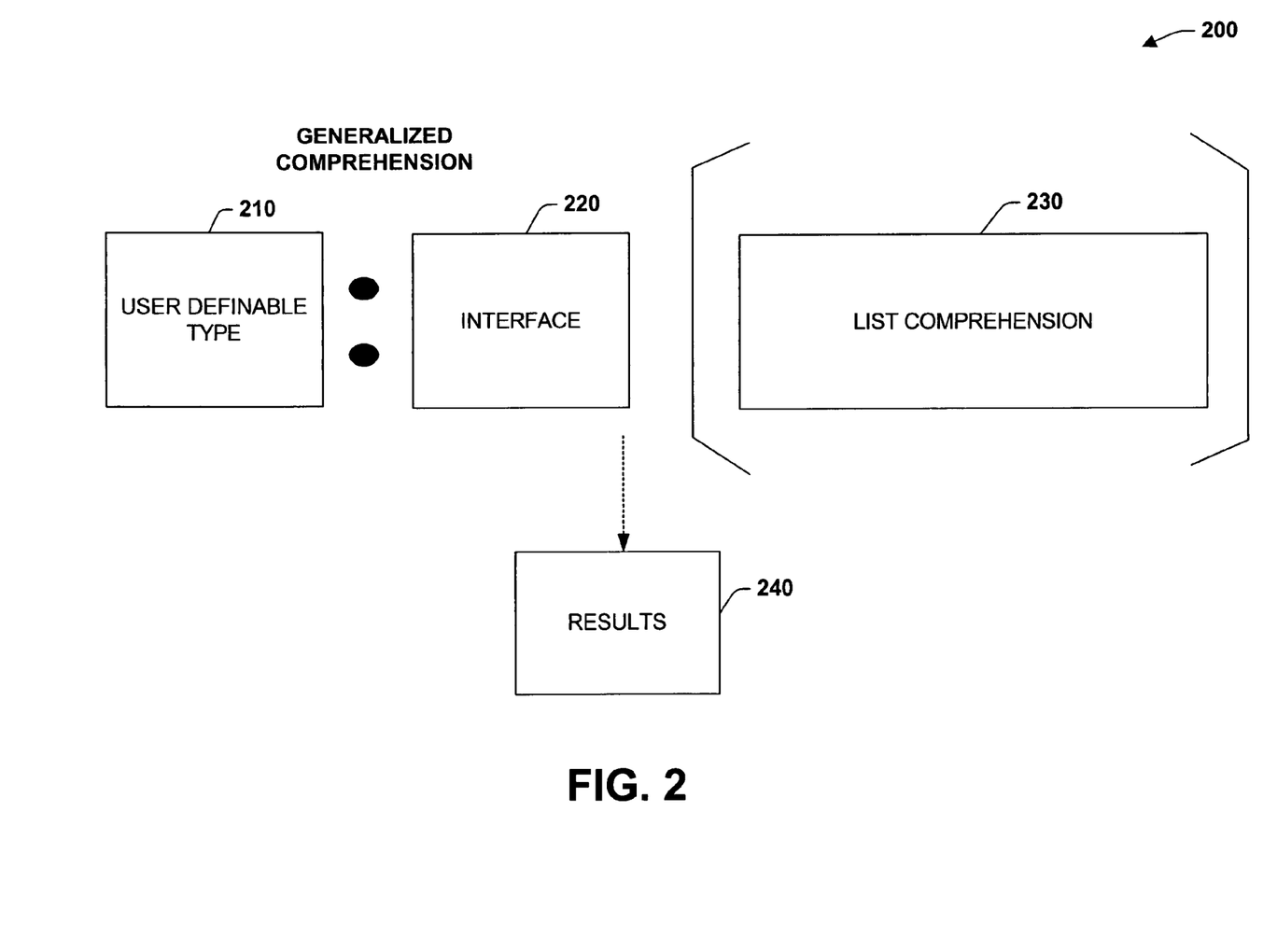
FIG. 2 is a diagram of a generalized programming model in accordance with an aspect of the present invention.

Referring now to FIG. 2, a generalized programming model 200 is illustrated in accordance with an aspect of the present invention. In this aspect, a user-definable type 210 is associated with an interface 220, wherein the interface defines user-defined or standard methods that perform the functions of the user-definable type. As illustrated, the type 210 and interface 220 are designated outside of a fixed or list comprehension expression 230, whereby the user-defined type can perform substantially any desired operation on the expression 230. Such operations can include database manipulations, mathematical manipulations, sorting operations, processing operations, filter operations, and/or other type operations that act to perform an operation on the expression 230. A result type or function is defined at 240 to receive output from the user-definable type 210 and associated operations on the expression 230. It is noted that the result function 240 can receive output in the same type as the user-definable type 210 or receive output in a different type or format. For example, elements can be added in Boolean form and return in the results 240 as a number or other type.

Figure 3:
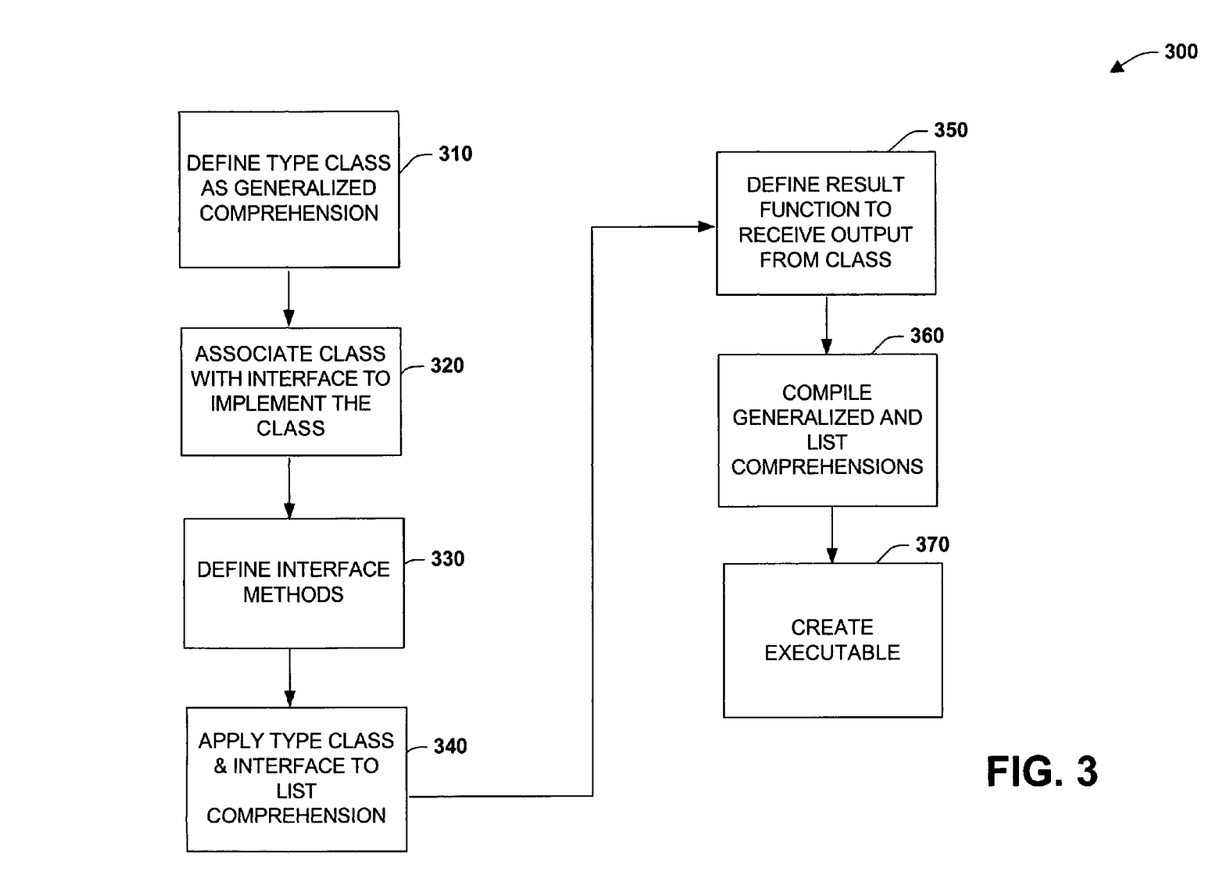
FIG. 3 is a flow diagram illustrating a generalized programming process in accordance with an aspect of the present invention.

FIG. 3 is a flow diagram illustrating a generalized programming process 300 in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 310, a user-definable type or class is specified as part of a generalized comprehension that appears as an outside operator to a fixed or static comprehension. At 320, the class is associated with an interface that implements the class. At 330, one or more methods are defined for the interface in order to supply desired functionality for the class. These methods can include user-defined methods or other type methods that may be supplied with commercially available development systems. At 340, the class and associated interface are applied in an exterior manner to a list or fixed comprehension function (e.g., assigned outside of braces defining list comprehension). At 350, a results function is defined to receive output from the class. As noted above, results can be returned in a similar or dissimilar type with respect to the type of the class. At 360, the generalized and associated list comprehensions are compiled with the interface methods to produce an executable format at 370. As noted above, compilation can occur according to traditional compilers that generate binary code which is then loaded on a machine for execution. Also, compilation can occur in a more real time manner such as with just-in-time compilation techniques.

Figure 4:
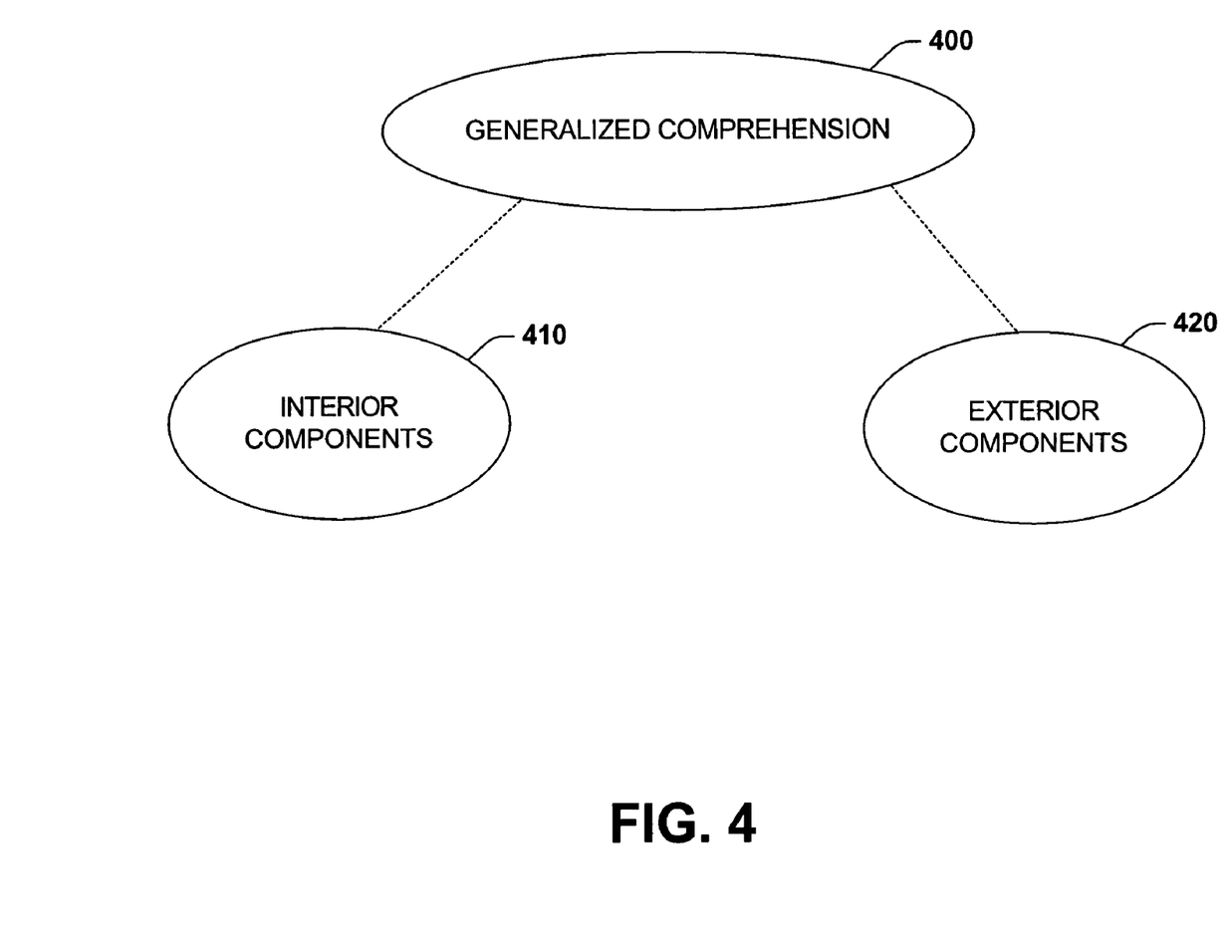
FIG. 4 is a diagram illustrating generalized comprehension examples in accordance with an aspect of the present invention.

FIG. 4 illustrates generalized comprehension examples 400 in accordance with an aspect of the present invention. In order to perform generalized comprehension 400, expressions may be formed, wherein one or more interior components 410 such as a fixed or static comprehension are operated upon an exterior component 420 defined by a generalized comprehension. In mathematics a ZF set comprehension that describes the set of squares of the odd numbers drawn from some source set A is typically written as $\{a^2 | a \in A \char`\^ odd(a)\}$.

Using the proposed comprehension notation, this set can be expressed succinctly in an executable programming language as follows:

MultiSet{$a$*$a$: int $a$ in $A, a$% 2==0}

It can be assumed that A supports an IEnumerable/ator interface. For instance, A may be an array of integers, or any other collection.

Operationally the comprehension can be interpreted as "for each integer a in A, if a is odd, then add the square of a to the result set. This can also be programmed using an explicit loop in vanilla C#—however this is not as expressive as the comprehension, instead of saying what set of values are wanted, programmers may be forced to program how to generate that set.

Phrases to the right of the colon in the interior comprehension 410 can be generators, filters or local declarations, for example. Generators introduce one or more variables and indicate (similar to a foreach loop) the range of values they may take on, e.g., int a in A. Filters specify conditions the variable satisfies to be included in the result, e.g., a % 2==0 and local declarations often help to structure comprehensions by lifting or filtering out sub-computations.

It is noted that the result of the comprehension (the exterior Set in front of the example) is made stated explicitly, which could also return bags, sequences, and so forth. For instance, the following example creates a sequence instead of a set of square roots:

Seq{a*a: a in A, a % 2==0} (Seq is exterior to the interior components in braces).

Results are not limited to collections, selected values can be reduced into any result by appropriately "adding" values to the result. For example, a maximum of all even squares in a collection A using the comprehension can be computed as:

Max{$a*a:a$ in $A, a\% 2==0$}

In this case, adding a value to the result is performed by taking the maximum. Also, this pattern is sufficient to define the universal quantification, by using && to add values to the result of the comprehension:

Forall{x % 2==0:a in A}

With comprehensions, it is possible to define substantially "any" imaginable operation that works on a collection. For instance, Sum, Average, Product, Forall, Exists, Choose, and so forth can be defined.

Figure 5:
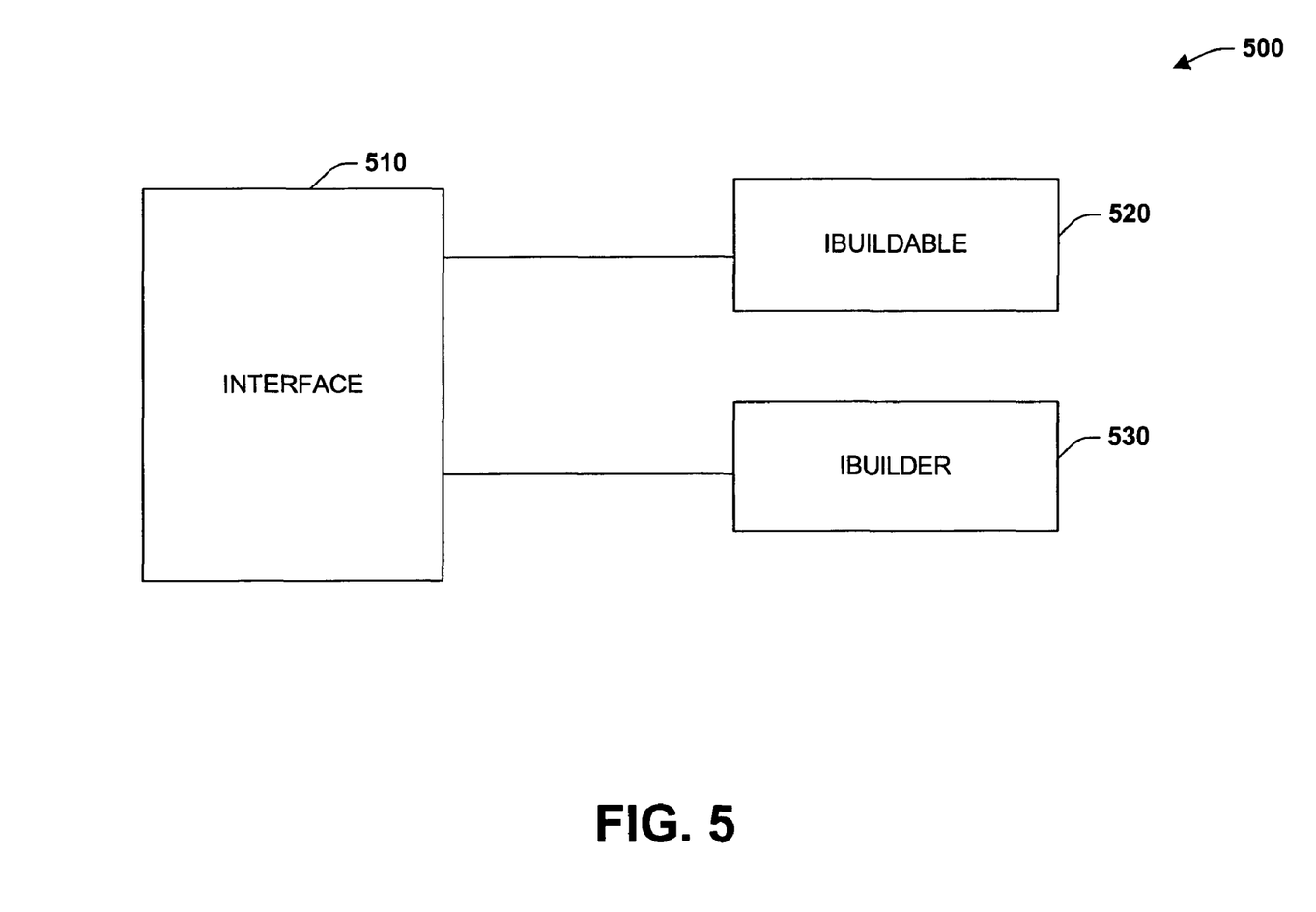
FIG. 5 is a diagram illustrating generalized comprehension definitions in accordance with an aspect of the present invention.

FIG. 5 illustrates generalized programming definitions 500 in accordance with an aspect of the present invention. This includes interface 510 having interface definitions IBuildable at 520 and IBuilder at 530. As noted above, other interfaces may be defined.

Similar to that foreach loops depend on the fact that a source collection implements an IEumerator/able pattern, generalized comprehensions can depend on a IBuildable/er pattern at 520 and 530. Ignoring databases for the moment, the translation of the expression:

res=Set{$a*a:a$ in $A, a\% 2==0$}, is the following loop:
 IBuilder<int> ib=new Set<int>( ).GetBuilder( );
 foreach(a in A)
 if(a % 2=0) ib.Add(a*a);
 res=ib.GetResult( );

Alternatively, the comprehension result type can also return its IBuilder interface 530 via a static function, in that case the first line would change to:
 IBuilder<int> ib=Set<int>.GetBuilder( );

The IBuildable 520 and IBuilder 530 interfaces can have the following form:

```
interface IBuildable<T,S>{
  IBuilder<T,S> GetBuilder( );
}
interface IBuilder<T,S>{
  void Add(T);
  S GetResult( );
}
```

The implementation of MultiSet is as follows:

```
class MultiSet<T>: IBuildable<T, MultiSet<T>>,
  IBuilder<T,MultiSet<T>> {
    ArrayList<T> res = new ArrayList( );
    IBuilder<T,Set<T>> GetBuilder( ) {return this;}
    MultiSet<T> GetResult( ) { return this;}
    void Add(T t){ res.Add(t);}
  ...
}
```
ArrayList is employed to hold values of the MultiSet and use its Add method to add values to the result.
One possible implementation of Max is as follows:
```
  struct Max<T>: IBuildable<T, T>, IBuilder<T,T> where
IComparable<T> {
    int HowMany=0;
    IComparable<T> res = new T( );
    IBuilder<T,Set<T>> GetBuilder( ) {return this;}
    void Add(T t){
      if(HowMany++ == 0) res = t;
      else if(res.CompareTo(t) < 0) res=t;
    }
    T GetResult( ) {
      if(HowMany == 0) throw newException("Max on empty domain");
      else return res;
    }
}
```

In this values are added to the result by taking the maximum of the current maximum res and the next value t. Note that a default value is not required. This explains why Max on an empty range has to throw an exception. Alternatively a default value new T( ); can be used, or also allow the user to specify a default value.

Figure 6:
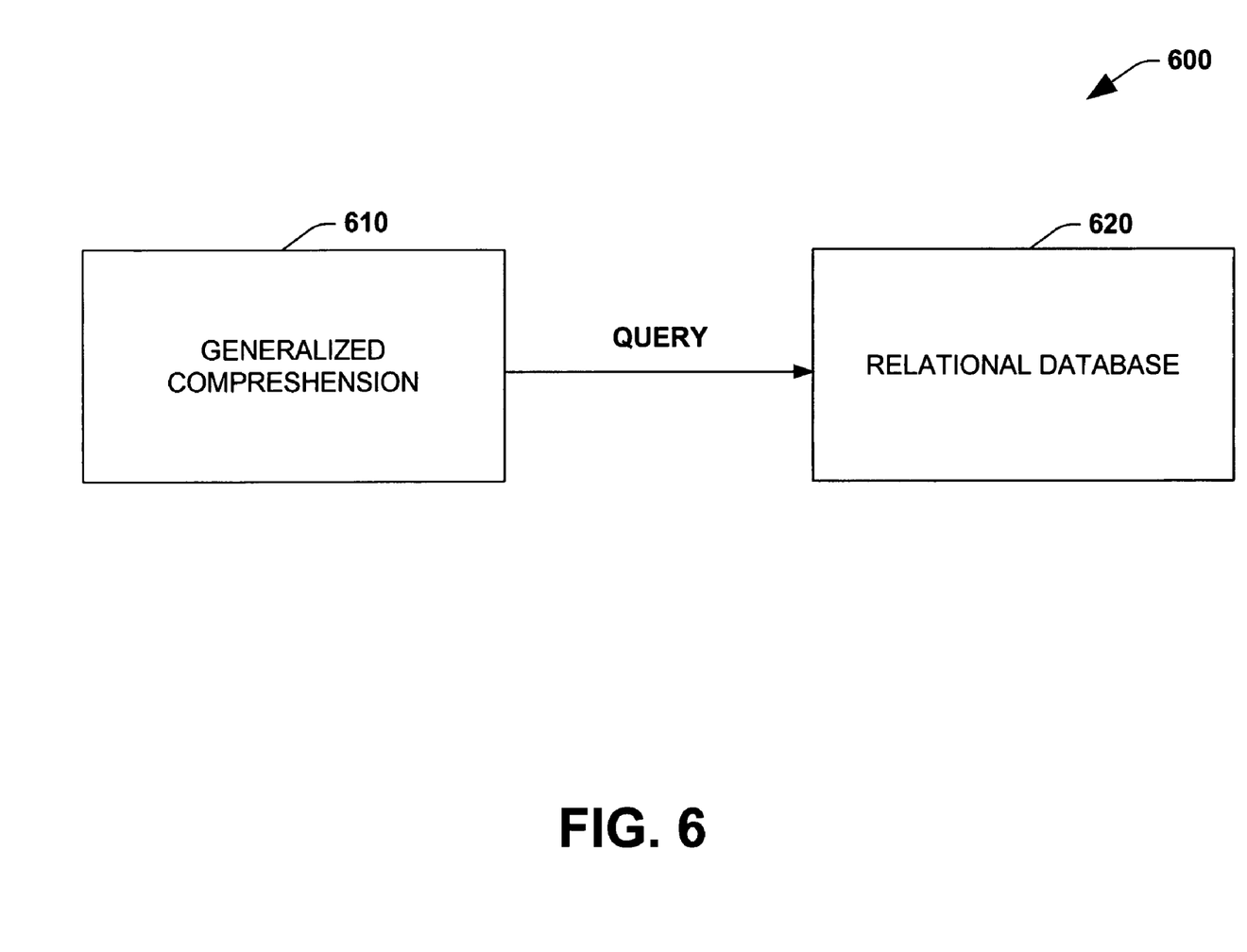
FIG. 6 is a diagram illustrating example query models in accordance with an aspect of the present invention.

FIG. 6 is a diagram illustrating an example query model 600 in accordance with an aspect of the present invention. In this aspect, generalized comprehensions 610 are employed to query a relational database at 620. Relational databases 620 provide a variety of query languages for deriving information from the data stored in the database. Most of these query languages are based on at least two related formalisms: relational algebra, or relational calculus. It turns out that generalized comprehensions are a useful match with relational calculus. The following describes some possible examples.

Assume that a database 620 has the following rows:
 Student{int StudentNo; string Name; int Level;}
 Course{int CourseNo; string Title; string Name;}
 Report{int StudentNo; int CourseNo; Marks Marks;}
 Professor{string Name; int RoomNo;}

Also, assume that these tables are mapped into classes where column names become field names and that these four tables are available as IEumerator/able, i.e.,
 IEnumerable<Student> Students;
 IEnumerable<Course> Courses;
 IEnumerable<Report> Reports;
 IEnumerable<Professor> Professors;
 Below are possible query examples:
 Retrieve all course numbers (or in more readable English: Retrieve the course number component of all Course instances c such that c is a row in the Courses table)
 MultiSet{c.CourseNo: Course c in Courses}
 Retrieve the numbers of all students whose level is 1
 MultiSet{s.StudentNo:Student s in Students, s.Level=1}
 Retrieve the numbers and names of students taking course number 121

```
MultiSet { new NameNumber(s.StudentNo, s.Name)
    : Students s in Students
    , Exists{ r.StudentNo == s.StudentNo && r.CourseNo == 121
        : Report r in Reports
        }
    }
```

Retrieve the numbers of those courses which are taken by at least one student in level 1 (arbitrary nesting supported)

```
MultiSet{ c.CourseNo
    : Course c in Courses
    , Exists{ r.StudentNo == s.StudentNo &&
        Exists{ s.StudentNo = r.StudentNo && s.Level == 1
            : Student s in Students
            }
        : Report r in Reports
        }
    }
```

Retrieve the names of the professors who teach courses attended by at least one student at level 2 (use of natural join)

MultiSet{1.Name
:Student s in Students, s.level==2
,Report r in Reports, s.StudentNo==r.ReportNo
,Course c in Courses
,Professor p in Professors, p.LectureNo==c.CourseNo
}

These comprehensions can be optimized in a similar way SQL queries can be optimized, since they satisfy a similar rich set of algebraic laws from relational calculus. Extensive research exists on translating these comprehensions into a "collection" algebra on which optimization can be performed and an execution plan can be generated. Thus, based on the source of the data (where they are in memory or on the hard-disk), different compilation techniques can be used for a similar syntactic form. As can be appreciated, a plurality of other type queries can be defined and utilized in accordance with the present invention.

Figure 7:
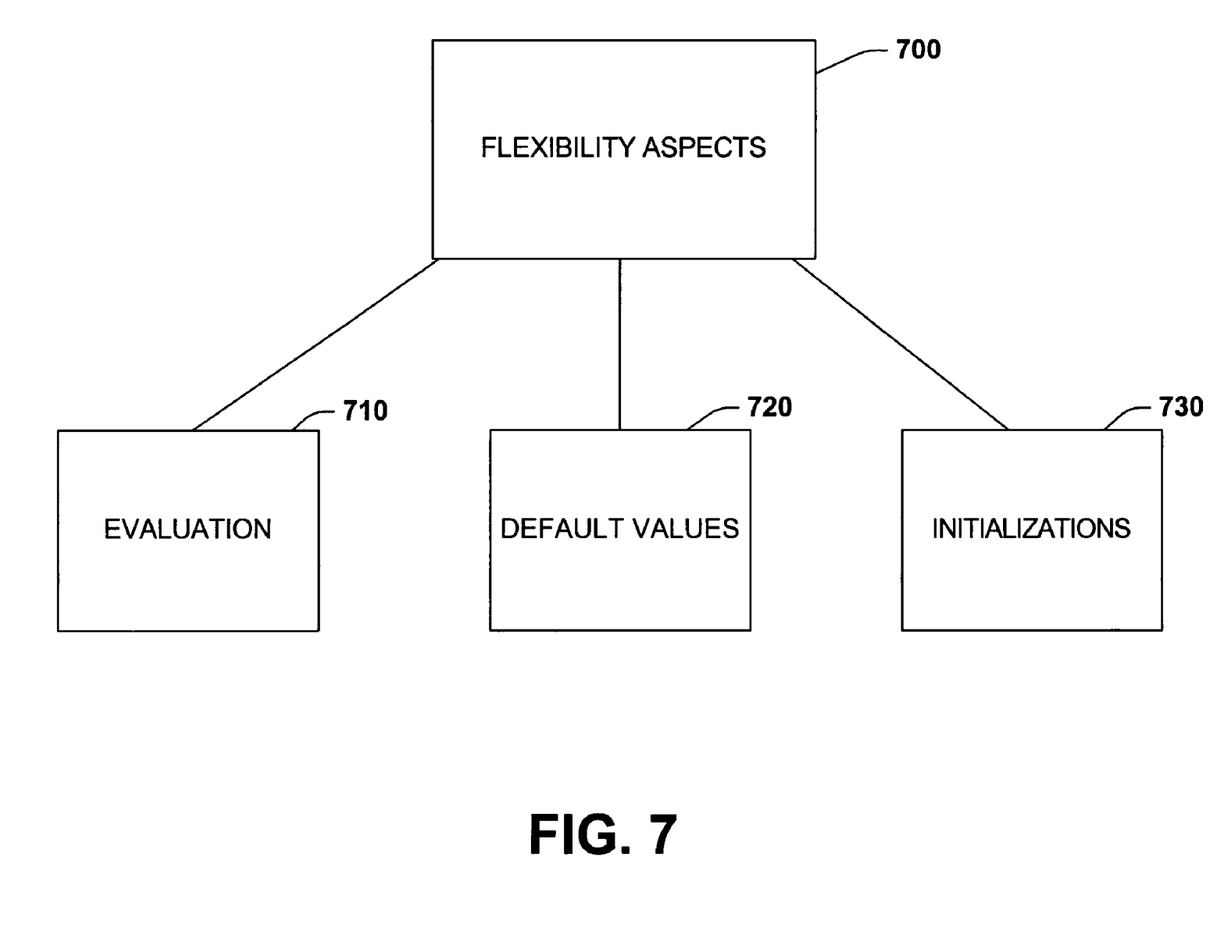
FIG. 7 is a diagram illustrating flexibility aspects in accordance with an aspect of the present invention.

FIG. 7 illustrates flexibility aspects 700 for generalized comprehension in accordance with an aspect of the present invention. Generalized comprehensions can be made more flexible using other possible additions such as:

At 710, an evaluation of a generalized comprehension can stop when a final result can be deduced from processing a part of a collection, i.e., Exists returns true as soon as one of the values in the collection is true, and Forall returns false when one of the values in the collection returns false, and Product can return 0 as soon as soon as the result is 0.

int[ ] A=new A[ ] {1,2,3}
    bool b=Forall{a % 2==0: a in A}

Here the evaluation stops after adding the 2.

Often, a default value 720 can be provided in case the collection is empty, e.g., Max over an integer set may take as the default value int.MinValue.

int[ ] A=new A[ ] { };
    int i=Max{x % 2==0: x in A, default int.MinValue}

Also, comprehensions can include arbitrary "initializations" 730 (i.e., without having to define a constructor with params array)

Set<int> A=Set{2,5,3,2,7,8,9};
    bool b=Forall{3% 2==0, true, "abc"=="cde"};

The functionality for the above example can be satisfied by using an Add for each element. The following describes possible changes for the examples for 710 and 720.

```
Define:
    interface IBuildable<T,S>{
        IBuilder<T,S> GetBuilder( );
    }
    interface IBuilder<T,S>{
        bool Add(T);
        bool HasResult( );
        S GetResult( );
    }
```

The translation of the code for Max is as follows:

```
int i;
    IBuilder<int,int> res = new Max( ).GetBuilder( );
    foreach (a in A)
        if (a %2 == 0)
            if (res.Add(a))
                break;
    if (res.HasResult( ))
        i = res.GetResult( );
    else
        i = int.MinValue;
```

And a translation of code for Forall is as follows:

```
bool b;
    IBuilder<int,int> res = new Forall( ).GetBuilder( );
    foreach (a in A)
        if (a %2 == 0)
            if (res.Add(a))
                break;
    b = res.GetResult( );
```

Note that this is possibly the fastest code for an in-memory data structure, provided the method calls are in-lined.

Figure 8:
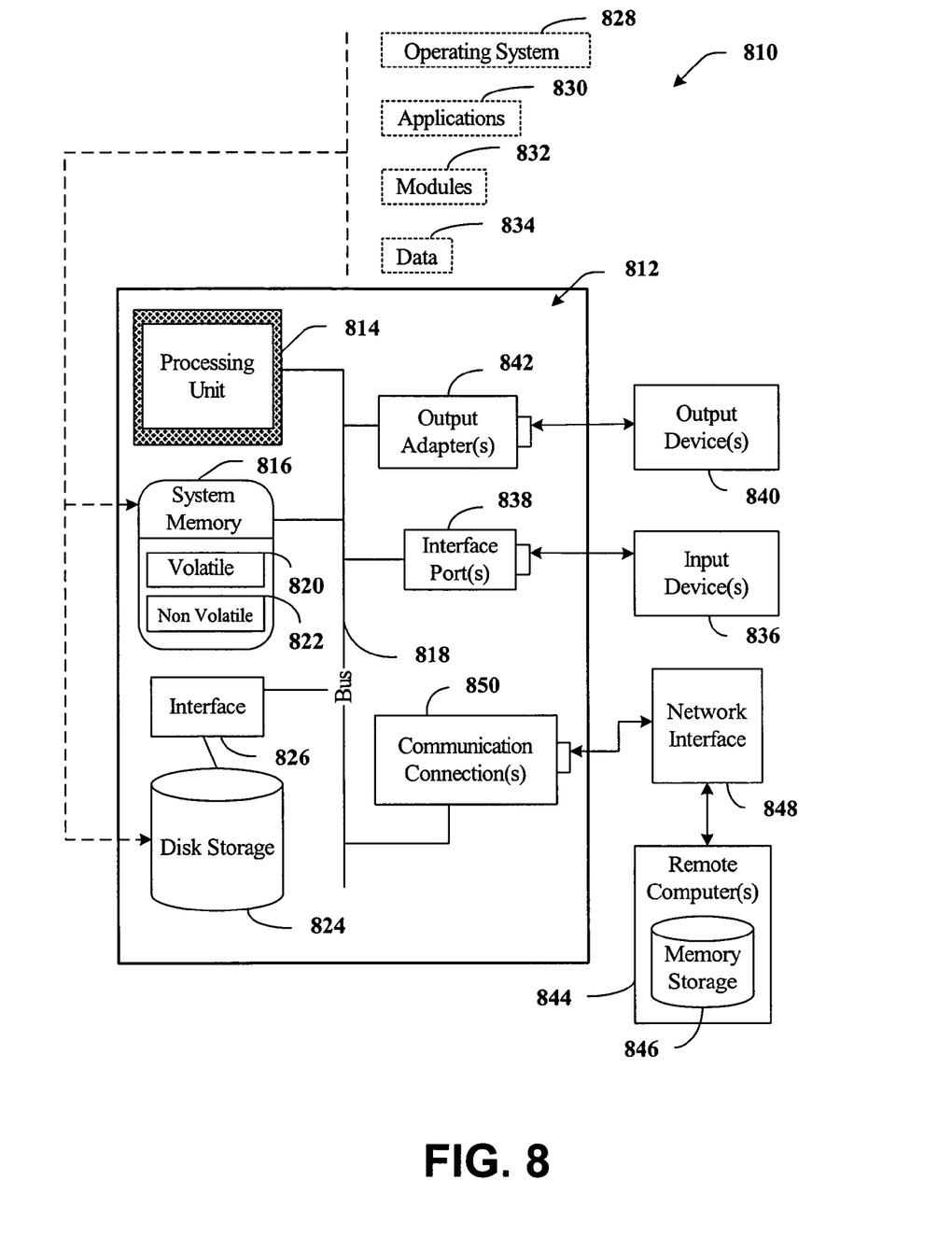
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
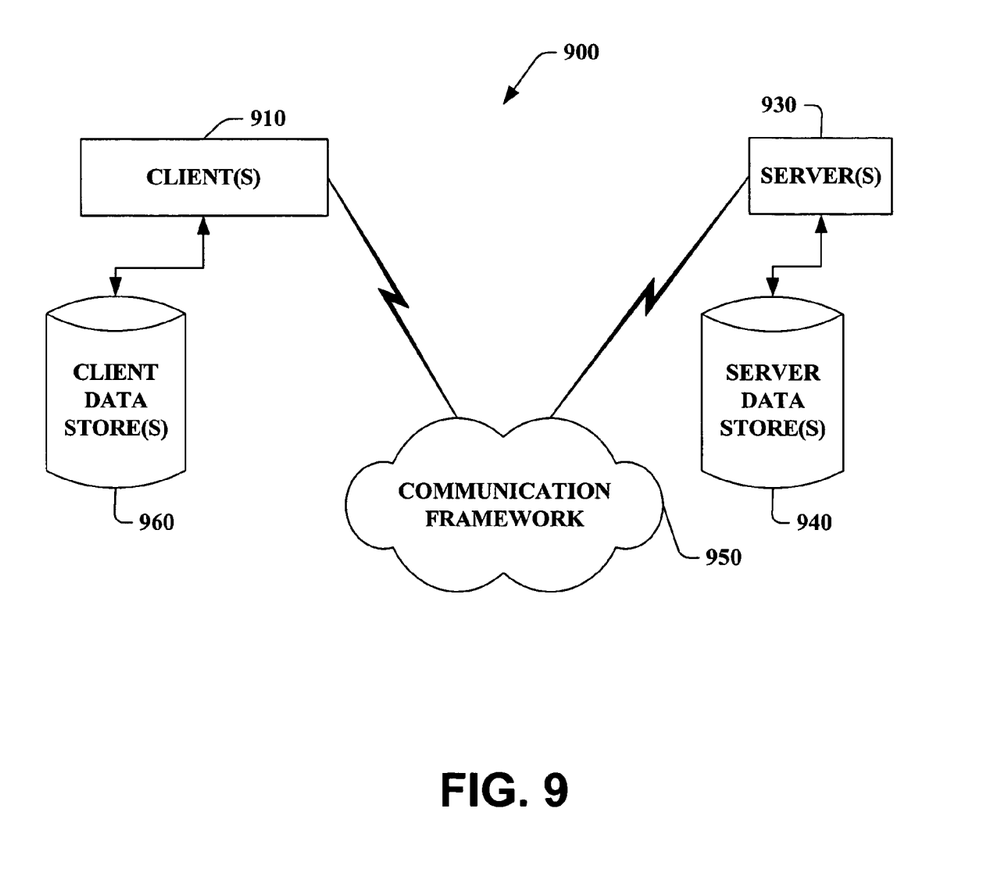
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable storage medium comprising:
   a language component for causing a computer to receive a user input expression comprising comprehension notations by specifying a user-definable type or class as part of a generalized comprehension that appears as an outside operator to a fixed or static comprehension, enabling programming of comprehension notations in the imperative language;

an interface component for causing the computer to describe a meaning of the comprehension by associating the user-definable type or class with an interface that implements the class, defining methods for the interface in order to supply desired functionality for the class, and by applying the class and associated interface in an exterior manner to a list or fixed comprehension function; and a translation component for causing the computer to analyze the meaning of the comprehension notations and facilitates execution of the comprehension notations in accordance with the imperative language.

2. A computer readable storage medium as recited in claim 1, wherein the translation component includes instructions for implementing at least one of just-in-time compilation techniques, interpretive techniques, and source code compilation techniques.

3. A computer readable storage medium as recited in claim 1, wherein the language component enables users to define at least one of an implicit expression, an explicit expression, a mathematical expression, a database expression, and a processing expression in accordance with the generalized comprehension.

4. A computer readable storage medium as recited in claim 1, wherein the comprehension notations comprise a mathematical parameterized monad.

5. A computer readable storage medium as recited in claim 1, wherein the interface component is associated with at least one of a final results function, an accumulation function for intermediate results, an early termination function, and a default value.

6. A computer readable storage medium as recited in claim 1, wherein the language, interface and translation components operate upon a generalized comprehension further comprising an assignment expression or a yield return statement.

7. A computer readable storage medium as recited in claim 1, wherein the language, interface and translation components operate upon a generalized comprehension further comprising a relational database expression.

8. A computer readable storage medium as recited in claim 7, wherein the relational database expression is employed for a query of a database.

9. A computer readable storage medium as recited in claim 1, having a data structure stored thereon, the data structure comprising:
   a first data field that defines the static comprehension notation in the imperative language;
   a second data field that defines the generalized comprehension notation received from a user input and comprising the static comprehension notation and a comprehension notation external to the static comprehension notation; and
   a third data field that links the static comprehension notation with the generalized comprehension notation.

10. A computer readable storage medium as recited in claim 9, wherein the data structure further comprises an interface field associated with the comprehension notation and at least one method associated with the interface field.

11. A computer readable storage medium as recited in claim 9, wherein the interface field is associated with at least one of a final results function, an accumulation function for intermediate results, an early termination function, and a default value.

12. A computer readable storage medium as recited in claim 9, wherein the generalized comprehension notation is associated with a user-defined expression.

13. A computer readable storage medium as recited in claim 9, further comprising a comprehension type for a direct aggregation of collections.

14. A computer readable storage medium as recited in claim 9, further comprising a field for an evaluation that is deduced from analyzing a portion of a collection.

15. A computer readable storage medium as recited in claim 9, further comprising a field associated with at least one of a default value and an initialization value.

16. A computer readable storage medium as recited in claim 9, further comprising a comprehension type that implicitly implements an interface.

17. A computer readable storage medium as recited in claim 9, further comprising an interface pattern for defining aggregation functions on collections.

18. A method for providing a programming environment for a user to input a generalized comprehension that is automatically translated into a language form in an imperative language, comprising:
   defining a list comprehension expression;
   defining a generalized comprehension class as an exterior component to the list comprehension expression within an imperative language environment;
   providing an interface class for the generalized comprehension class; and
   compiling the list comprehension expression and the generalized comprehension class to produce an executable format for the imperative language environment.

19. The method of claim 18, further comprising defining a results function for the interface class.

20. The method of claim 19, the results function returns a type that is at least one of similar and dissimilar to a type associated with the generalized comprehension class.

21. The method of claim 18, further comprising defining at least one relational database expression.

22. A method for providing a programming environment for a user to input a generalized comprehension that is automatically translated into a language form in an imperative language, comprising:
   specifying a user-definable type or class as part of a generalized comprehension that appears as an outside operator to a fixed or static comprehension;
   associating the user-definable type or class with an interface that implements the class;
   defining methods for the interface in order to supply desired functionality for the class;
   applying the class and associated interface in an exterior manner to a list or fixed comprehension function;
   defining a results function to receive output from the class; and
   compiling the generalized and associated list comprehensions with the interface methods to produce an executable format.

* * * * *